US012561808B2

(12) United States Patent
Taguchi et al.

(10) Patent No.: US 12,561,808 B2
(45) Date of Patent: Feb. 24, 2026

(54) MEDICAL IMAGE-PROCESSING APPARATUS, CHANGE-DEGREE CALCULATION METHOD, AND NON-VOLATILE COMPUTER-READABLE MEDIUM

(71) Applicant: CANON MEDICAL SYSTEMS CORPORATION, Otawara (JP)

(72) Inventors: Akihiro Taguchi, Sakura (JP); Ryo Shiroishi, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 357 days.

(21) Appl. No.: 18/302,181

(22) Filed: Apr. 18, 2023

(65) Prior Publication Data

US 2023/0334670 A1     Oct. 19, 2023

(30) Foreign Application Priority Data

Apr. 19, 2022   (JP) ................................. 2022-069045
Apr. 14, 2023   (JP) ................................. 2023-066349

(51) Int. Cl.
*G06T 7/00*          (2017.01)
*G06T 7/11*          (2017.01)
*G06T 7/174*         (2017.01)

(52) U.S. Cl.
CPC .............. *G06T 7/0016* (2013.01); *G06T 7/11* (2017.01); *G06T 7/174* (2017.01); *G06T 2207/30004* (2013.01)

(58) Field of Classification Search
CPC ......... G06T 7/0016; G06T 7/11; G06T 7/174; G06T 7/254; G06T 2207/30004
See application file for complete search history.

(56) References Cited

U.S. PATENT DOCUMENTS 10,699,410 B2 *   6/2020   Pheiffer .................. G06T 7/136
10,902,597 B2 *   1/2021   Grimmer ................. G06T 7/41
(Continued)

FOREIGN PATENT DOCUMENTS

CN          106227992 A      12/2016
JP          2008-173213 A     7/2008

OTHER PUBLICATIONS

Cheng et al. "A multi-scale multiple sclerosis lesion change detection in a multi-sequence MRI." Deep Learning in Medical Image Analysis and Multimodal Learning for Clinical Decision Support: 4th International Workshop, DLMIA 2018, and 8th International Workshop, ML-CDS 2018 (Year: 2018).*
(Continued)

*Primary Examiner* — Katrina R Fujita
(74) *Attorney, Agent, or Firm* — Oblon, McClelland, Maier & Neustadt, L.L.P.

(57)                ABSTRACT

A medical image-processing apparatus according to an embodiment includes processing circuitry. The processing circuitry acquires a first medical image captured at first timing, and a second medical image in which an identical position to the first medical image is captured at second timing, which is different from the first timing, identifies a change region to be a logical OR of a first region included in the first medical image and a second region that corresponds to the first region and is included in the second medical image when the first medical image and the second medical image are overlaid on each other in an aligned manner, and calculates a degree of change of the change region between the first timing and the second timing based on the first region and the second region that form the change region.

10 Claims, 10 Drawing Sheets

(56)                    References Cited

U.S. PATENT DOCUMENTS

| | | | | |
|---|---|---|---|---|
| 11,182,901 | B2 * | 11/2021 | Schirman | ................ G06T 7/136 |
| 2005/0113961 | A1 * | 5/2005 | Sabol | .................... A61B 5/055 |
| | | | | 700/182 |
| 2010/0104158 | A1 * | 4/2010 | Shechtman | ............ G06V 10/40 |
| | | | | 382/165 |
| 2019/0188853 | A1 | 6/2019 | Schirman et al. | |

OTHER PUBLICATIONS

Calabrese et al. "A fully automated artificial intelligence method for non-invasive, imaging-based identification of genetic alterations in glioblastomas." Scientific reports 10.1 (2020): 11852. (Year: 2020).*
Jin et al. "Predicting treatment response from longitudinal images using multi-task deep learning." Nature communications 12.1 (2021): 1851. (Year: 2021).*
Shofty et al. "MRI radiomics analysis of molecular alterations in low-grade gliomas." International journal of computer assisted radiology and surgery 13 (2018): 563-571. (Year: 2018).*
Combined Chinese Office Action and Search Report issued Jul. 24, 2025 in Chinese Patent Application No. 202310412973.5, 8 pages.

* cited by examiner (a)       (b)

(a)       (b)

(a)
(b)

(a)
(b)

| REGION (DEGREE OF CHANGE) | FIRST CHANGE REGION (DEGREE OF CHANGE: LARGE) | SECOND CHANGE REGION (DEGREE OF CHANGE: SMALL) | THIRD CHANGE REGION (NO CHANGE) | FOURTH CHANGE REGION (SHRUNK) |
|---|---|---|---|---|
| GENE CLASSI-FICATION OF INTEREST | AA1 | AA2 | AA3 | AA4 |
| TREATMENT | A | C | E | - |

FIG.11

DEGREE OF CHANGE

SECOND REGION

FIRST REGION

FIG.12

MEDICAL IMAGE-PROCESSING APPARATUS, CHANGE-DEGREE CALCULATION METHOD, AND NON-VOLATILE COMPUTER-READABLE MEDIUM

CROSS-REFERENCE TO RELATED APPLICATIONS

This application is based upon and claims the benefit of priority from Japanese Patent Application No. 2022-069045, filed on Apr. 19, 2022 and Japanese Patent Application No. 2023-066349, filed on Apr. 14, 2023; the entire contents of which are incorporated herein by reference.

FIELD

Embodiments described herein relate generally to a medical image-processing apparatus, a change-degree calculation method, and a non-volatile computer-readable medium.

BACKGROUND

Conventionally, Radiomics analysis to predict a nature and prognosis of a lesion by improving the efficiency and accuracy of diagnosis by comprehensively analyzing medical images captured by an X-ray computed tomography (CT) apparatus, a magnetic resonance imaging (MRI) apparatus, or the like has been studied. Moreover, a segmentation technique of separating a region of a region of interest for analysis of a lesion from a medical image has been used.

A lesion can partially become large or small. That is, a lesion has various degrees of change in respective portions. There has been a request to perform analysis per degree of change of a lesion.

However, the conventional segmentation technique is to segment a region of interest for analysis, but does not enable calculation of a degree of change.

BRIEF DESCRIPTION OF THE DRAWINGS

FIG. 11 is a diagram for explaining about an example of a method of assigning a degree of change; and FIG. 12 is a diagram for explaining about an example of a segmentation method of segmenting into plural regions.

DETAILED DESCRIPTION

Hereinafter, a medical image-processing apparatus, a change-degree calculation method, and a non-volatile computer-readable medium according to the present embodiment will be explained with reference to the drawings. In the following embodiments, components assigned with common reference signs are intended to operate similarly, and duplicated explanation will be omitted as appropriate.

First Embodiment

Figure 1:
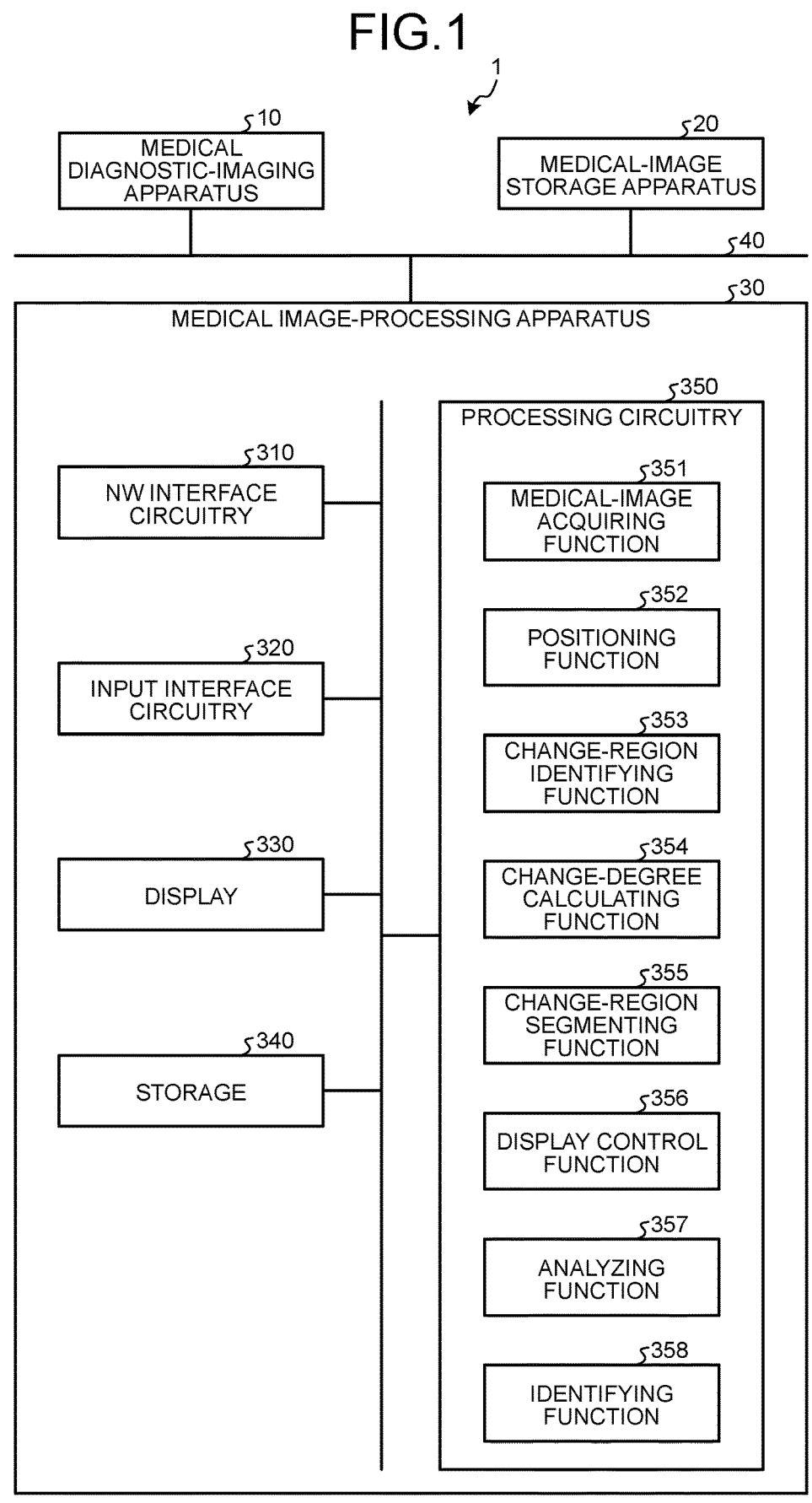
FIG. 1 is a block diagram illustrating an example of a configuration of a change-degree calculation system according to a first embodiment.

FIG. 1 is a block diagram illustrating an example of a configuration of a change-degree calculation system 1 according to a first embodiment. The change-degree calculation system 1 includes a medical diagnostic-imaging apparatus 10, a medical-image storage apparatus 20, and a medical image-processing apparatus 30. Moreover, the respective apparatuses included in the change-degree calculation system 1 are connected to one another through a network 40. The configuration illustrated in FIG. 1 is one example, and the number of the respective systems and apparatuses may be changed arbitrarily. Furthermore, apparatuses not illustrated in FIG. 1 may be connected to the network 40.

The medical diagnostic imaging apparatus 10 is an apparatus to image a subject. For example, the medical diagnostic-imaging apparatus 10 is an apparatus, such as an X-ray CT apparatus, an MRI apparatus, an X-ray diagnostic apparatus, an ultrasound diagnostic apparatus, a positron emission tomography (PET) apparatus, and a single photon emission computed tomography (SPECT) apparatus. The medical diagnostic-imaging apparatus 10 is not limited to apparatuses described above, but may be other apparatuses.

The medical image-storage apparatus 20 stores a medical image captured by the medical diagnostic-imaging apparatus 10. The medical image-storage apparatus 20 is a server device of a picture archiving and communication system (PACS), and stores a medical image in a format compliant with digital imaging and communications in medicine (DICOM). The medical image is, for example, a CT image data, a magnetic resonance image data, an ultrasound diagnostic image data, and the like, but is not limited thereto. The medical image-storage apparatus 20 is implemented by a computer device, such as a database (DB) server, and causes a semiconductor memory device, such as a random access memory (RAM) and a flash memory, or a storage circuit, such as a hard disk and an optical disk, to store data of a medical image.

The medical image-processing apparatus 30 is implemented by a computer device, such as a server and a workstation. The medical image-processing apparatus 30 acquires two or more medical images of an identical region captured at different times for the same subject from the medical image-storage apparatus 20. The medical image-processing apparatus 30 analyzes how the shape of a region subject to analysis included in each of the medical images has changed over time based on the acquired two or more medical images. For example, the medical image-processing apparatus 30 acquires a degree of change in each of segments in a region subject to analysis by calculating a degree of change at a position of each portion over time.

The medical image-processing apparatus 30 will be explained in detail.

The medical image-processing apparatus 30 includes a network (NW) interface circuitry 310, an input interface circuitry 320, a display 330, a storage 340, and processing circuitry 350.

The NW interface circuitry 310 is connected to the processing circuitry 350, and controls transmission and communication of various kinds of data that are performed with respective devices connected thereto through the network 40. For example, the NW interface circuitry 310 is implemented by a network card, a network adaptor, a network interface controller (NIC), and the like.

The input interface circuitry 320 is connected to the processing circuitry 350, and converts an input operation accepted from an operator (medical professional) into an electrical signal, to output to the processing circuitry 350. Specifically, the input interface circuitry 320 converts an input operation accepted from an operator into an electrical signal, and output it to the processing circuitry 350. For example, the input interface circuitry 320 is implemented by a trackball, a switch button, a mouse, a keyboard, a touch pad with which an input operation is performed by touching an operating surface, a touch screen in which a display screen and a touch pad are integrated, a non-contact input circuit using an optical sensor, a sound input circuit, and the like. In the present specification, the input interface circuitry 320 is not limited to those including a physical operating part, such as a mouse and a keyboard. For example, a processing circuit of an electrical signal that receives an electrical signal corresponding to an input operation from an external input device provided separately from the apparatus, and outputs this electrical signal to the control circuit is also included in examples of the input interface circuitry 320.

The display 330 is connected to the processing circuitry 350, and displays various kinds of information and images output from the processing circuitry 350. For example, the display 330 is implemented by a liquid crystal monitor, a cathode ray tube (CRT) display, an organic EL display, a plasma display, a touch panel, and the like.

The storage 340 is connected to the processing circuitry 350, and stores various kinds of data. Moreover, the storage 340 stores various kinds of programs to implement various kinds of functions by the processing circuitry 350 retrieving and executing therefrom. For example, the storage 340 is implemented by a semiconductor memory device, such as a RAM and a flash memory, a hard disk, an optical disc, and the like.

The processing circuitry 350 controls overall operations of the medical image-processing apparatus 30. The processing circuitry 350 includes, for example, a medical-image acquiring function 351, a positioning function 352, a change-region identifying function 353, a change-degree calculating function 354, a change-region segmenting function 355, a display control function 356, an analyzing function 357, and an identifying function 358. In the embodiment, respective processing functions performed by the medical-image acquiring function 351, the positioning function 352, the change-region identifying function 353, the change-degree calculating function 354, the change-region segmenting function 355, the display control function 356, the analyzing function 357, and the identifying function 358 being the components are stored in the storage 340 in a form of computer-executable program. The processing circuitry 350 is a processor. The processing circuitry 350 is a processor that reads out and executes programs from the storage 340, and thereby implements functions corresponding to the respective programs. In other words, the processing circuitry 350 that has read out the respective programs is to have the respective functions indicated in the processing circuitry 350 in FIG. 1. The storage 340 is a non-volatile computer-readable medium, and is one example of a storage medium that includes a command to execute on a computer.

Although it has been explained that a single unit of processor implements the medical-image acquiring function 351, the positioning function 352, the change-region identifying function 353, the change-degree calculating function 354, the change-region segmenting function 355, the display control function 356, the analyzing function 357, and the identifying function 358 in FIG. 1, the processing circuitry 350 may be configured by combining plural independent processors, and may implement the functions with the respective processors executing the respective programs. Moreover, although it has been explained that a single unit of storage circuit, such as the storage 340, stores programs corresponding to the respective processing functions in FIG. 1, plural units of storage circuits may be arranged in a distributed manner, and the processing circuitry 350 may be configured to read out a corresponding program from an individual storage circuit.

The term "processor" used in the above explanation signifies a circuit, such as a central processing unit (CPU), a graphical processing unit (GPU), an application specific integrated circuit (ASIC), a programmable logic device (for example, simple programmable logic device (SPLD), complex programmable logic device (CPLD)), and a field programmable gate array (FPGA). The processor implements a function by reading out and executing a program stored in the storage 340. Instead of storing a program in the storage 340, it may be configured to directly install a program in a circuit of the processor. In this case, the processor reads out and executes the program installed in the circuit, to implement the function.

The medical-image acquiring function 351 acquires a first medical image that is captured at first timing, and a second medical image in which an identical position to the first medical image is captured at second timing, which is different from the first timing. The medical-image acquiring function 351 is one example of an acquiring unit. More specifically, the medical-image acquiring function 351 acquires the first medical image and the second medical image including a substantially identical position of a subject from the medical image-storage apparatus 20 for the same subject. For example, the second timing is a later point of time than the first timing.

The positioning function 352 performs positioning of a first region R11 (refer to FIG. 2) subject to analysis included in the first medical image and a second region R12 (refer to FIG. 2) subject to analysis included in the second medical image. In other words, the positioning function 352 overlays the first region R11 subject to analysis included in the first medical image and the second region R12 subject to analysis included in the second medical image on each other.

The change-region identifying function 353 identifies, when the first medical image and the second medical image are overlaid on each other and in an aligned manner, a change region R1 to be a logical OR of the first region R11 included in the first medical image and the second region R12 corresponding to the first region R11 and included in the second medical image. The change-region identifying function 353 is one example of a first identifying unit. That is, the change-region identifying function 353 identifies the change region R1 to be a logical OR of the first region R11 included in the first medical image and the second region R12 included in the second region R12 that are positioned by the positioning function 352. The second region R12 is a region that corresponds to the first region R11, and subject to analysis. That is, the second region R12 is a region subject to analysis that is the region subject to analysis in the first region R11 has undergone a displacement over time.

Figure 2:
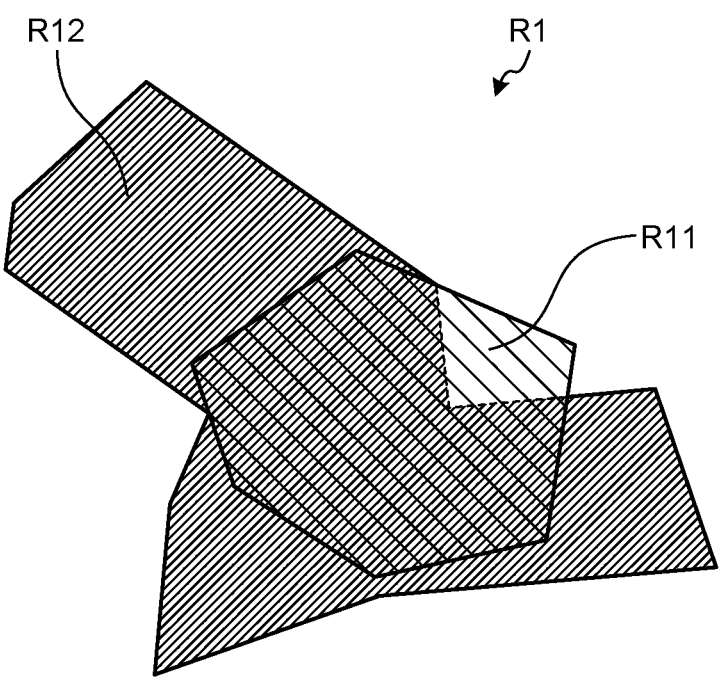
FIG. 2 is a diagram illustrating an example of a region of change.

FIG. 2 is a diagram illustrating an example of the change region R1. FIG. 2 illustrates a state in which the shape of the first region R11 of the first medical image captured at the first timing has been displaced over time to the shape of the second region R12 of the second medical image captured at the second timing. Moreover, the first region R11 and the second region R12 illustrated in FIG. 2 are subjected to positioning to be aligned by the positioning function 352. The change region R1 is a region that is formed by a logic OR of the first region R11 and the second region R12. In other words, the change region R1 is a region that is formed by a larger contour, out of the first region R11 and the second region R12.

The first region R11 and the second region R12 are regions subject to analysis of a lesion and the like. For example, the first region R11 and the second region R12 are typically a region of a tumor. The first region R11 and the second region R12 are regions subject to analysis of an identical tumor or the like that has changed its size over time. The first region R11 and the second region R12 may be regions of those other than a tumor. For example, the first region R11 and the second region R12 may be of a brain tumor, a bone, or a blood vessel.

For example, when the first region R11 and the second region R12 are a brain tumor, a medical professional analyzes the changed region R1 of the brain tumor in observation of a glioblastoma cell over time. The change region R1 is segmented based on the degree of spread of the glioblastoma, and is used for estimation of tumor characteristics, such as gene expression of each region.

For example, when the first region R11 and the second region R12 are a bone, a medical professional analyzes the change region R1 of the bone from images acquired in the process of bone healing through an inflammatory phase, a repair phase, and a remodeling phase in a conservative treatment for a bone fracture. The change region R1 is segmented based on the degree of inflammation spread and bone healing, and are used to estimate the degree of inflammation, the bone density, and the calcium level of each region.

For example, when the first region R11 and the second region R12 are a blood vessel, a medical professional analyzes the change region R1 of a vascular wall of a carotid artery in observation of a carotid artery stenosis over time. The change region R1 is segmented based on the degree of thickness of a vascular wall, and is used to estimate plaque accumulation and calcification of each region.

The change-degree calculating function 354 calculates a degree of change of the change region R1 between the first timing and the second timing based on the first region R11 and the second region R12 forming the change region R1. The change-degree calculating function 354 is one example of a calculating unit.

More specifically, the change-degree calculating function 354 calculates a vector indicating a displacement of the region of the second region R12 of the second timing with respect to the first region R11 of the first timing. That is, the change-degree calculating function 354 calculates a vector indicating a change from the first region R11 for each part of the second region R12. The change-degree calculating function 354 assigns a displacement vector to each pixel in the first region R11 as a degree of change based on the calculated vector.

First, a calculation method of a vector that indicates a displacement of a region of the second region with respect to the first region R11 will be explained.

For example, the change-degree calculating function 354 calculates a vector indicating a displacement of a region by using block matching method. In block matching method, for a small region including one pixel and surrounding pixels around the one pixel in the first region R11, the change-degree calculating function 354 detects a small region that has a high similarity thereto from the second region R12.

As a method of calculating the similarity, sum of absolute difference (SAD) or sum of squared difference (SSD) can be used. In SAD, the change-degree calculating function 354 calculates an absolute value of a difference for each pixel between the first region R11 and the second region R12, and uses a total sum of the absolute values as an evaluation value for the similarity. The evaluation value indicates a higher degree of similarity as it decreases. In SAD, the change-degree calculating function 354 calculates the square of a difference for each pixel between a small region of the first region R11 and a small region of the second region R12, and uses the total sum squares as an evaluation value. The evaluation value indicates a higher degree of similarity as it decreases.

As described, the change-degree calculating function 354 detects a small region having a high similarity from the second region R12. The change-degree calculating function 354 draws a vector toward the small region having a high similarity in the second region R12 from the first region R11.

Alternatively, the change-degree calculating function 354 calculates a vector indicating a displacement of a region by gradient method. In gradient method, the change-degree calculating function 354 draws a vector called optical flow that indicates a displacement between the first region R11 and the second region R12. The change-degree calculating function 354 detects a small region identical to a small region in the first region R11 from the second region R12. The change-degree calculating function 354 then draws a vector from the small region of the first region R11 toward the detected second region R12. Moreover, the change-degree calculating function 354 may calculate by Lucas-Kanade (LK) method or Horn-Shunck (HS) method.

Alternatively, the change-degree calculating function 354 calculates a vector indicating a displacement of a region by vertex connectivity algorithm. In vertex connectivity algorithm, the change-degree calculating function 354 detects vertices respectively from the first region R11 and the second region R12 such that the number of vertices of the first region and the number of vertices of the second region R12 coincide with each other. The change-degree calculating function 354 then draws a vector from a vertex of the first region to a vertex of the second region R12 that is positioned closest to this vertex when the first region R11 and the second region R12 are overlaid on each other.

Alternatively, the change-degree calculating function 354 calculates a vector indicating a displacement of a region by contour tracing algorithm. In contour tracing algorithm, the change-degree calculating function 354 detects a contour of the first region R11 and a contour of the second region R12. The change-degree calculating function 354 draws a vector from a pixel of the contour of the first region R11 toward a pixel of the second region R12 closest to this pixel when the first region R11 and the second region R12 are overlaid on each other.

For example, the change-degree calculating function 354 calculates a vector indicating a displacement of a region by block matching method, gradient method, vertex connectivity algorithm, or contour tracing algorithm. The change-degree calculating function 354 may calculate a vector indicating a displacement of a region by methods other than these.

Figure 3:
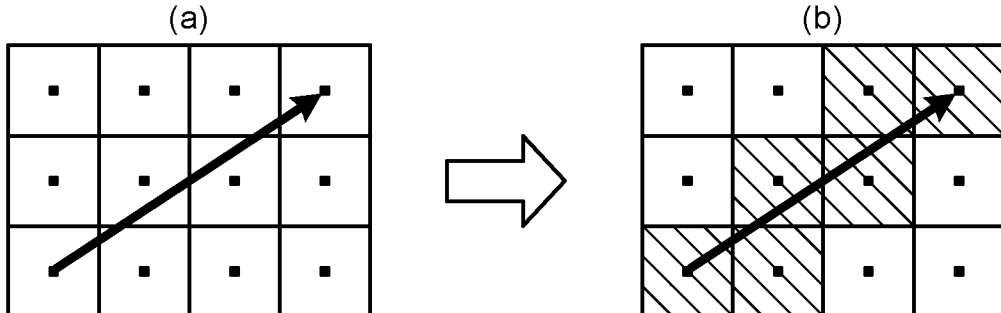
FIG. 3 is a diagram for explaining about an example of assigning a displacement vector to pixels through which a vector passes.

Next, a method of assigning a displacement vector to each pixel of the change region R1 as a degree of displacement based on a calculated vector will be explained by using FIG. 3 and FIG. 6. FIG. 3 to FIG. 6 illustrate a state in which pixels are arranged in three rows in a vertical direction and four columns in a horizontal direction. By methods indicated by FIG. 3 to FIG. 6, the change-degree calculating function 354 assigns a displacement vector that is calculated based on a vector indicating a change from the first region R11 to the second region R12 to each pixel of the change region R1 as a degree of change.

FIG. 3 is a diagram for explaining about an example of assigning a displacement vector to pixels through which a vector passes. As illustrated in (a) in FIG. 3, the vector is directed from bottom left to top right. In this case, the change-degree calculating function 354 assigns a displacement vector having a direction and a magnitude of a vector to respective pixels hatched in (b) in FIG. 3.

Figure 4:
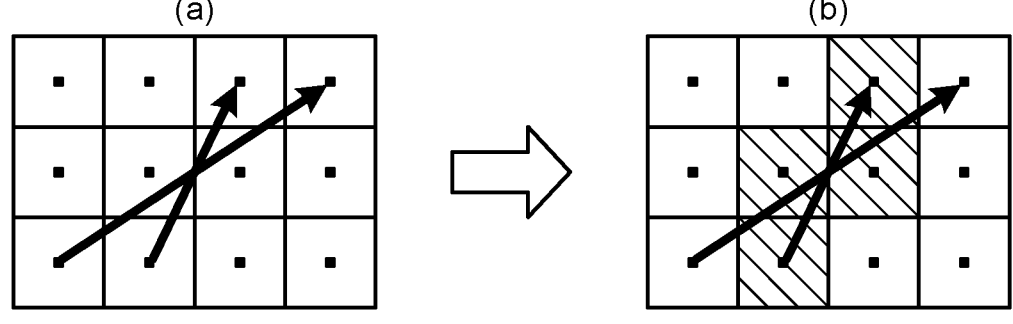
FIG. 4 is a diagram for explaining about an example of assigning displacement vectors to pixels through which overlapping vectors pass.

FIG. 4 is a diagram for explaining about an example of assigning a displacement vector to pixels through which overlapping vectors pass. As illustrated in (a) in FIG. 4, two vectors intersect each other, and the two pixels pass through four pixels. When plural intersecting vectors are added to one pixel, the change-degree calculating function 354 calculates respective average values of direction and magnitude of the respective vectors. Specifically, when the vectors intersect each other at any point in the change region R1, the change-degree calculating function 354 calculates respective average values of direction and magnitude of the respective vectors. The change-degree calculating function 354 assigns a displacement vector having respective average values of direction and magnitude of the vectors to respective hatched pixels in (b) in FIG. 4.

In the case of a pixel through which a vector intersecting at any point in the change region R1 passes but not two or more vectors pass, the change-degree calculating function 354 assigns a displacement vector having a direction and a magnitude of the vector. Through a bottom-left pixel and a top-right pixel illustrated in FIG. 4, a vector intersecting a any point in the change region R1 passes but not two or more vectors. In such a case, the change-degree calculating function 354 assigns a displacement vector having a direction and a magnitude of the vector passing through the pixel.

Figure 5:
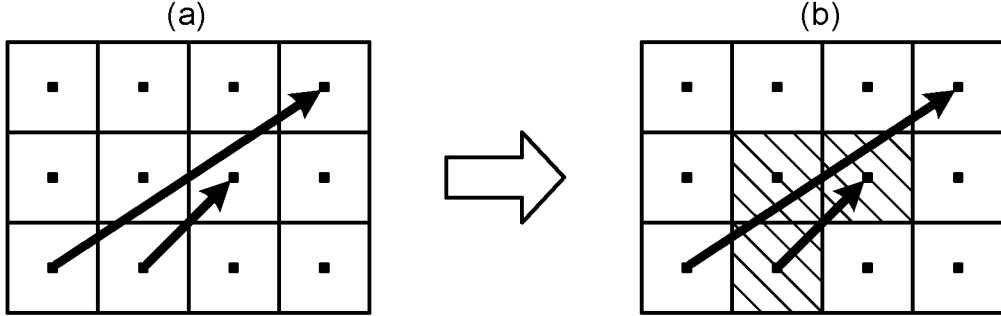
FIG. 5 is a diagram for explaining about an example of assigning a displacement vector to pixels through which two or more vectors that are directed to an identical direction but not intersecting each other pass.
Figure 6:
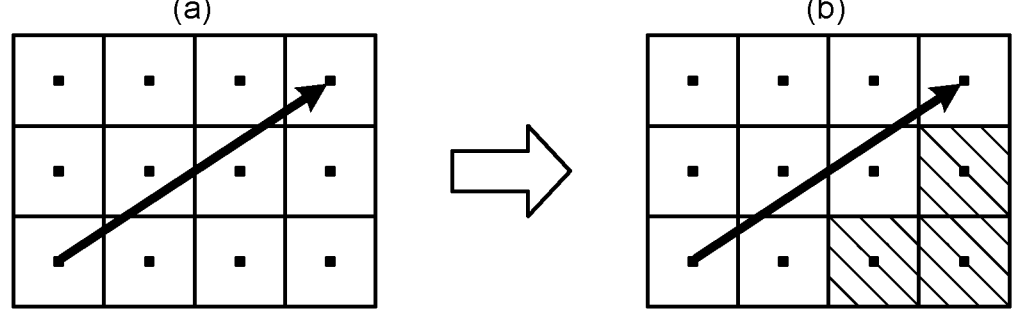
FIG. 6 is a diagram for explaining about an example of assigning a displacement vector to pixels through which no vectors pass.

FIG. 5 is a diagram for explaining about an example of assigning a displacement vector with respect to a pixel through which two or more vectors directed to an identical direction, and not intersecting each other pass. As illustrated in (a) in FIG. 5, the two vectors are directed to an identical direction, but not intersecting each other. In such a case, the change-degree calculating function 354 acquires the magnitude of a vector having the largest magnitude out of two or more vectors passing through a pixel. The change-degree calculating function 354 assigns a displacement vector having a direction and the acquired magnitude of the vector to each of pixels hatched in (b) in FIG. 5.

In the case of a vector through which two or more vectors do not pass, the change-degree calculating function 354 assigns a displacement vector having a direction and a magnitude of a vector. Through a bottom-left pixel and an up-right pixel illustrated in FIG. 5, two or more vectors do not pass. In such a case, the change-degree calculating function 354 assigns a displacement vector having a direction and a magnitude of a vector that passes through the pixels.

FIG. 6 is a diagram for explaining about an example of assigning a displacement vector to a pixel through which no vectors pass. To a pixel through which no vectors pass, the change-degree calculating function 354 assigns a displacement vector that is calculated based on a displacement vector assigned to a surrounding pixel. As illustrated in (a) in FIG. 6, through three pixels in the bottom right, no vectors pass. In this case, the change-degree calculating function 354 assigns a displacement vector having a direction and a magnitude of a vector calculated based on a displacement vector assigned to a surrounding pixel to each of hatched pixels in (b) in FIG. 6.

The change-degree calculating function 354 does not assign a displacement vector when a vector passes through a pixel outside the change region R1. Moreover, when there is a part that has been shrunk from the first region R11 in the second region R12, the change-degree calculating function 354 may multiply a magnitude of a vector of the pixel corresponding to the shrunk part by a negative value.

The change-region segmenting function 355 segments the change region R1 into plural regions based on degrees of change. The change-region segmenting function 355 is one example of a segmenting unit. That is, the change-region segmenting function 355 segments into plural regions based on a similarity between a displacement vector assigned to a pixel and a displacement vector assigned to a surrounding pixel of this pixel.

For example, the change-region segmenting function 355 determines whether a displacement vector assigned to pixel A, which is one pixel, and respective displacement vectors assigned to respective pixels adjacent to pixel A are similar. When it is determined as not similar, the change-region segmenting function 355 forms a boundary line between pixel A and a pixel not similar thereto, to segment into plural regions. On the other hand, when it is determined as similar, the change-region segmenting function 355 does not form a boundary line to segment into plural regions.

More specifically, the change-region segmenting function 355 calculates a similarity between a magnitude ($|a1|$) and a direction ($\theta1$) of a displacement vector assigned to pixel A and a magnitude ($|a2|$) and a direction ($\theta2$) of a displacement vector assigned to pixel B, which is a pixel adjacent to pixel A. For example, the change-region segmenting function 355 calculates the similarity by Equation below.

$$\text{Similarity} = ((|a_1|\cos\theta1 - |a2|\cos\theta2) + (|a1|\sin\theta1 - |a_2|\sin\theta_2))$$

The change-region segmenting function 355 calculates similarities of respective pixels adjacent to pixel A, not limited to pixel B. Furthermore, the change-region segmenting function 355 performs processing of calculating a similarity to adjacent pixels with respect to respective pixels in the change region R1, not limited to pixel A. Moreover, the change-region segmenting function 355 may assign weights to degrees of similarity according to a distance between pixels. Furthermore, the calculation method of similarity is one example, and other methods may be used for calculation.

Moreover, the change-region segmenting function 355 counts the number of adjacent pixels having a similarity equal to or higher than a first threshold, for pixel A. Furthermore, not limited to pixel A, the change-region segmenting function 355 performs the processing of counting the number of adjacent pixels having a similarity equal to or higher than the first threshold for respective pixels of the change region R1.

Moreover, the change-region segmenting function 355 determines whether the number of adjacent pixels having a similarity equal to or higher than the first threshold is equal to or larger than a second threshold, for pixel A. In other words, the change-region segmenting function 355 determines whether the displacement vector of pixel A is similar to respective displacement vectors of the respective adjacent vectors.

When the number of adjacent pixels having a similarity equal to or higher than the first threshold is equal to or larger than the second threshold, the change-region segmenting function 355 determines that pixel A and respective displacement vectors assigned to the respective adjacent pixels are similar to each other, and the change-region segmenting function 355 does not form a boundary line to segment into plural regions.

On the other hand, when the number of adjacent pixels having similarity equal to or higher than the first threshold is smaller than the second threshold, the change-region segmenting function 355 determines that respective displacement vectors assigned to pixel A and to the respective adjacent pixels are not similar to each other. The change-region segmenting function 355 forms a boundary line between pixel A and a pixel not similar thereto, to segment into plural regions.

Furthermore, not limited to pixel A, the change-region segmenting function 355 determines whether the number of adjacent pixels having a similarity equal to or higher than the first threshold is equal to or larger than the threshold for respective pixels of the change region R1. The change-region segmenting function 355 forms a boundary line to segment into plural regions based on determination results of respective pixels of the change region R1.

The change-region segmenting function 355 may perform the processing described above on plural pixels at a time, not limited to one pixel at a time. In this case, the change-region segmenting function 355 calculates, for example, an average value of the plural pixels. The change-region segmenting function 355 may perform the processing described above on the plural pixels at a time.

Furthermore, not limited to the method described above, the change-region segmenting function 355 may segment the change region R1 into plural regions by other methods. For example, the change-region segmenting function 355 may define classes according to a magnitude of displacement vector, and may segment into plural regions based on a class according to a magnitude of a displacement vector of each pixel. That is, the change-region segmenting function 355 may segment the change region R1 into plural regions based on classes according to a magnitude of a displacement vector assigned to respective pixels as a degree of change, based on class information in which classes according to a magnitude of a displacement vector are defined.

The display control function 356 displays the plural regions segmented by the change-region segmenting function 355 in a display mode according to a degree of change. The display control function 356 is one example of a display control unit. For example, the display control function 356 displays a change degree image G1 indicating a degree of change of each part of the change region R1 on the display 330.

Figure 7:
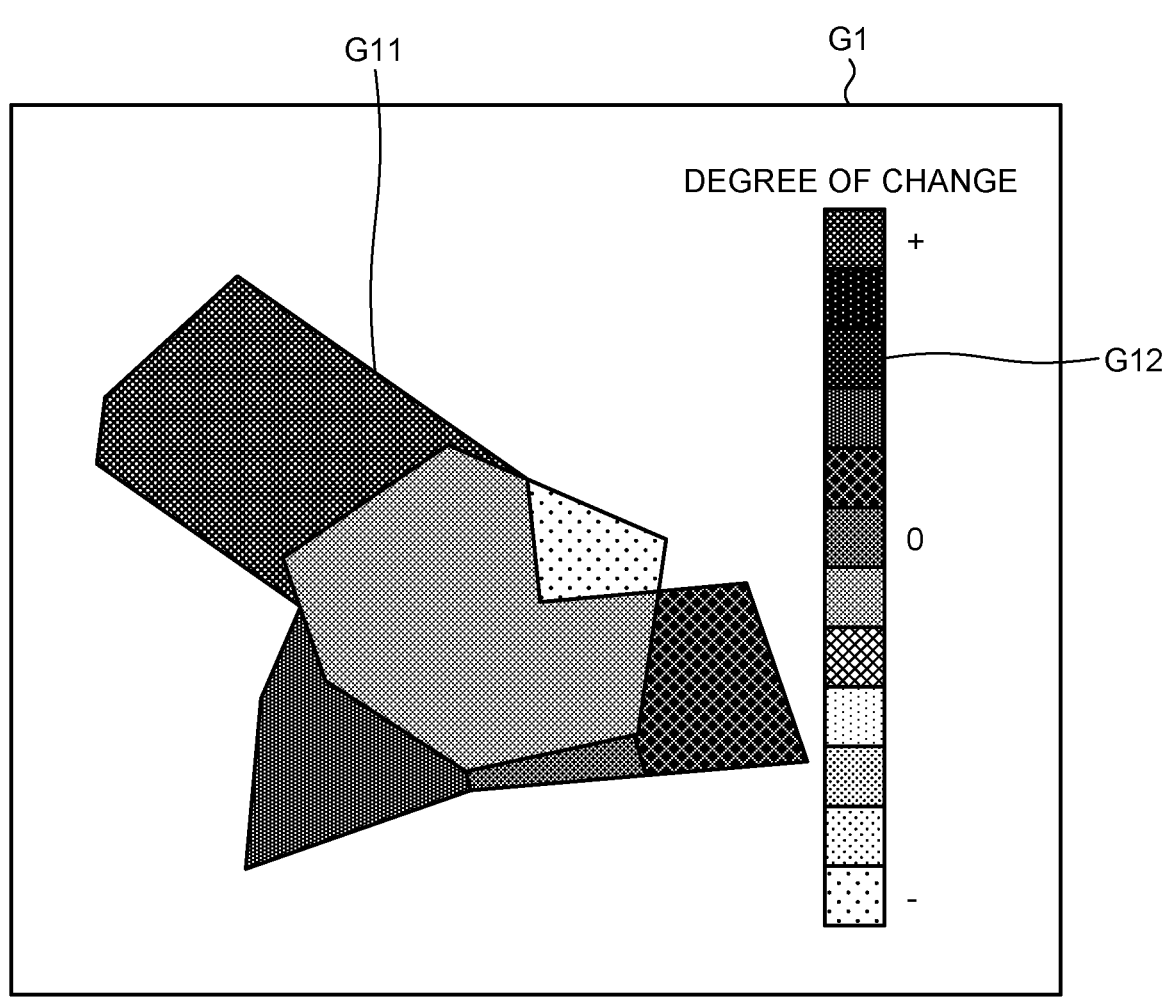
FIG. 7 is a diagram illustrating an example of a change degree image.

FIG. 7 is a diagram illustrating an example of the change degree image G1. The change degree image G1 includes a change region image G11 and a display mode image G12. The display mode image G12 is an image indicating a display mode according to a degree of change. The change degree image G11 is an image in which the plural regions of the change region R1 segmented by the change-region segmenting function 355 in a display mode according to a degree of change indicated by the display mode image G12.

The analyzing function 357 performs processing of analyzing respective regions of the change region R1 segmented by the change-region segmenting function 355. For example, the analyzing function 357 calculates a feature for each of the regions segmented by the change-region segmenting function 355. The analyzing function 357 is one example of an analyzing unit. Not limited to calculation of features, the analyzing function 357 may perform other analysis.

For example, when the change region R1 is a brain tumor, the change-region segmenting function 355 segments the change region R1 into plural regions according to a degree of change indicating a degree of spread of a glioblastoma. In this case, the analyzing function 357 estimates tumor characteristics, such as gene expression of each region.

For example, when the change region is a bone, the change-region segmenting function 355 segments the change region R1 into plural regions according to a degree of change indicating a degree of inflammation spread and bone healing. In this case, the analyzing function 357 estimates the degree of inflammation, the bone density, and the calcium level of each region.

For example, when the change region R1 is a blood vessel, the change-region segmenting function 355 segments the change region R1 into plural regions according to a degree of change indicating the degree of thickness of a vascular wall. IN this case, the analyzing function 357 estimates plaque accumulation and calcification of each region.

The identifying function 358 identifies a gene classification of interest for each of plural regions segmented by the change-region segmenting function 355. The identifying function 358 is one example of a second identifying unit. Respective cells forming a tumor has a genetic heterogeneity even in a single tumor of a single patient. That is, depending on the regions segmented by the change-region segmenting function 355, a gene classification of interest is different.

The identifying function 358 identifies a gene classification of interest by performing radiomics analysis based on a degree of change of each of plural regions segmented by the change-region segmenting function 355. For example, the identifying function 358 identifies a gene classification of interest for each of the regions segmented by the change-region segmenting function 355 based on gene classification information in which a degree of change and a gene classification are associated with each other. Not limited to identifying based on the gene classification information, the identifying function 358 may identify a gene classification by trained model, or may identify a gene classification by other methods.

Furthermore, the identifying function 358 identifies a treatment according to a gene classification of interest. For example, the identifying function 358 identifies a treatment according to a gene classification of interest based on treatment information in which a gene classification and a treatment are associated with each other. Treatments include a treatment by molecularly targeted drug, a treatment by radiation, and the like. That is, the identifying function 358 determines that a treatment by molecularly targeted drug is suitable, that a treatment by radiation is suitable, or the like according to a gene classification. The identifying function 358 may identify treatment by using a trained model, or by other methods, not limited to the treatment information.

Furthermore, the identifying function 358 displays a gene classification of each of the regions segmented by the change-region segmenting function 355, and treatment according to the gene classification on the display 330. For example, the identifying function 358 displays a gene classification of each of the regions segmented by the change-region segmenting function 355, and a treatment support image G2 that indicates treatment according to the gene classification.

Figure 8:
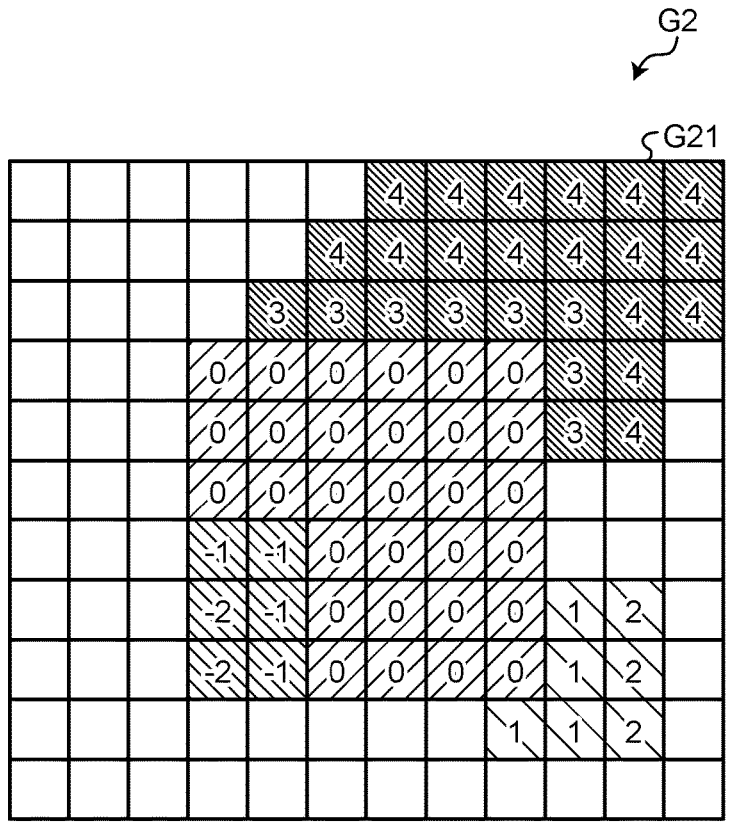
FIG. 8 is a diagram illustrating an example of a treatment support image.

FIG. 8 is a diagram illustrating an example of the treatment support image G2. The treatment support image G2 includes a region segmentation image G21 and a list image G22. The region segmentation image G21 is an image showing plural regions segmented by the change-region segmenting function 355 in a discriminable manner. For example, the region segmentation image G21 is an image that shows a first change region that is a region having a large degree of change, such as 4, or 3, a second change region that is a region having a small degree of change, such as 2 or 1, a third change region that is a region in which a degree of change indicates no change, such as 0, and a fourth change region that is a region in which a degree of change indicates shrinkage, such as –2 and –1, in a discriminable manner.

The list image G22 is an image that shows a gene classification of interest identified by the identifying function 358, and treatment identified by the identifying function 358 for each of the regions segmented by the change-region segmenting function 355. In the first change region, "AA1" is indicated as a gene classification of interest, and "A" is indicated as treatment. In the second change region, "AA2" is indicated as a gene classification of interest, and "C" is indicated as treatment. In the third change region, "AA3" is indicated as a gene classification of interest, and "E" is indicated as treatment. In the fourth change region, "AA4" is indicated as a gene classification of interest. Because the fourth change region is shrunk and does not need to be treated, treatment is not indicated therein.

Next, region-specific analysis processing performed by the medical image-processing apparatus 30 will be explained.

Figure 9:
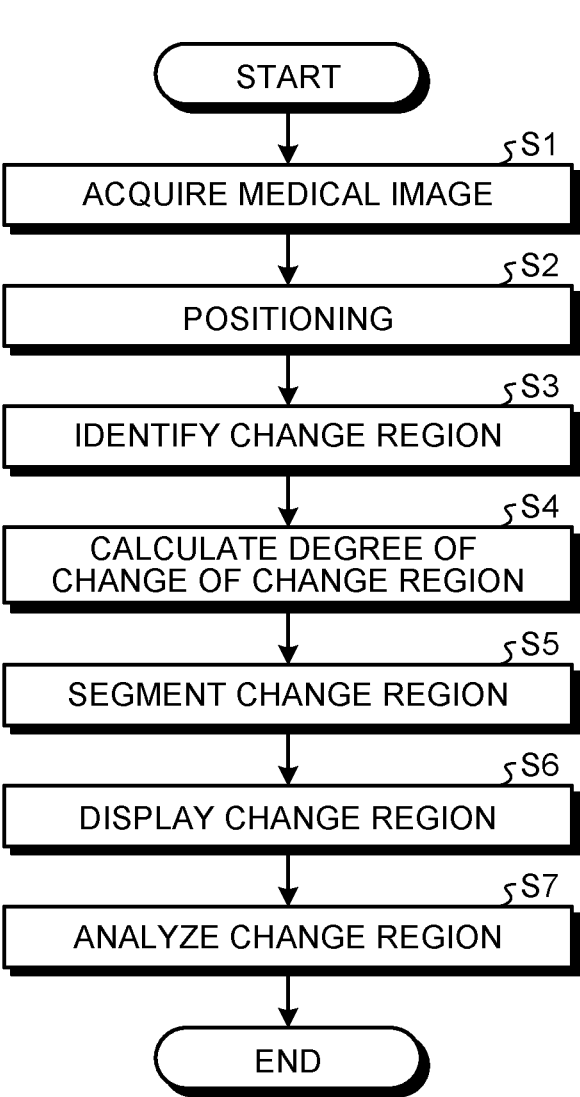
FIG. 9 is a flowchart illustrating an example of a region-specific analysis processing performed by the medical image-processing apparatus according to the first embodiment.

FIG. 9 is a flowchart illustrating an example of the region-specific analysis processing performed by the medical image-processing apparatus 30 according to the first embodiment.

The medical-image acquiring function 351 acquires the first medical image captured at the first timing and the second medical image captured at the second timing from the medical-image storage apparatus 20 (step S1).

The positioning function 352 performs positioning such that the first region R11 included in the first image and the second region R12 included in the second region are overlaid on each other (step S2).

The change-region identifying function 353 identifies the change region R1 to be a logical OR of the first region R11 and the second region R12 (step S3).

The change-degree calculating function 354 calculates a degree of change of the change region R1 between the first timing and the second timing based on the first region R11 and the second region R12 (step S4).

The change-region segmenting function 355 segments the change region R1 into plural regions based on degree of change (step S5).

The display control function 356 displays the regions of the change region R1 segmented by the change-region segmenting function 355 in a display mode according to respective degrees of change (step S6).

The analyzing function 357 performs analysis processing to calculate a feature for each of the regions of the change region R1 segmented by the change-region segmenting function 355 (step S7).

By performing the above processing, the medical image-processing apparatus 30 ends the region-specific analysis processing.

As described above, the medical image-processing apparatus 30 according to the first embodiment acquires the first medical image captured at the first timing, and the second medical image in which an identical position to the first medical image is captured at the second timing, which is different from the first timing. Moreover, the medical image-processing apparatus 30 identifies the change region R1 to be a logical OR of the first region R11 included in the first medical image and the second region R12 corresponding to the first region R11 and included in the second medical image when the first medical image and the second medical image are overlaid on each other in an aligned manner. The medical image-processing apparatus 30 calculates a degree of change of the change region R1 between the first timing and the second timing based on the first region R11 and the second region R12 that form the change region R1. Thus, the medical image-processing apparatus 30 can calculate a degree of change of a region subject to analysis.

Second Embodiment

Figure 10:
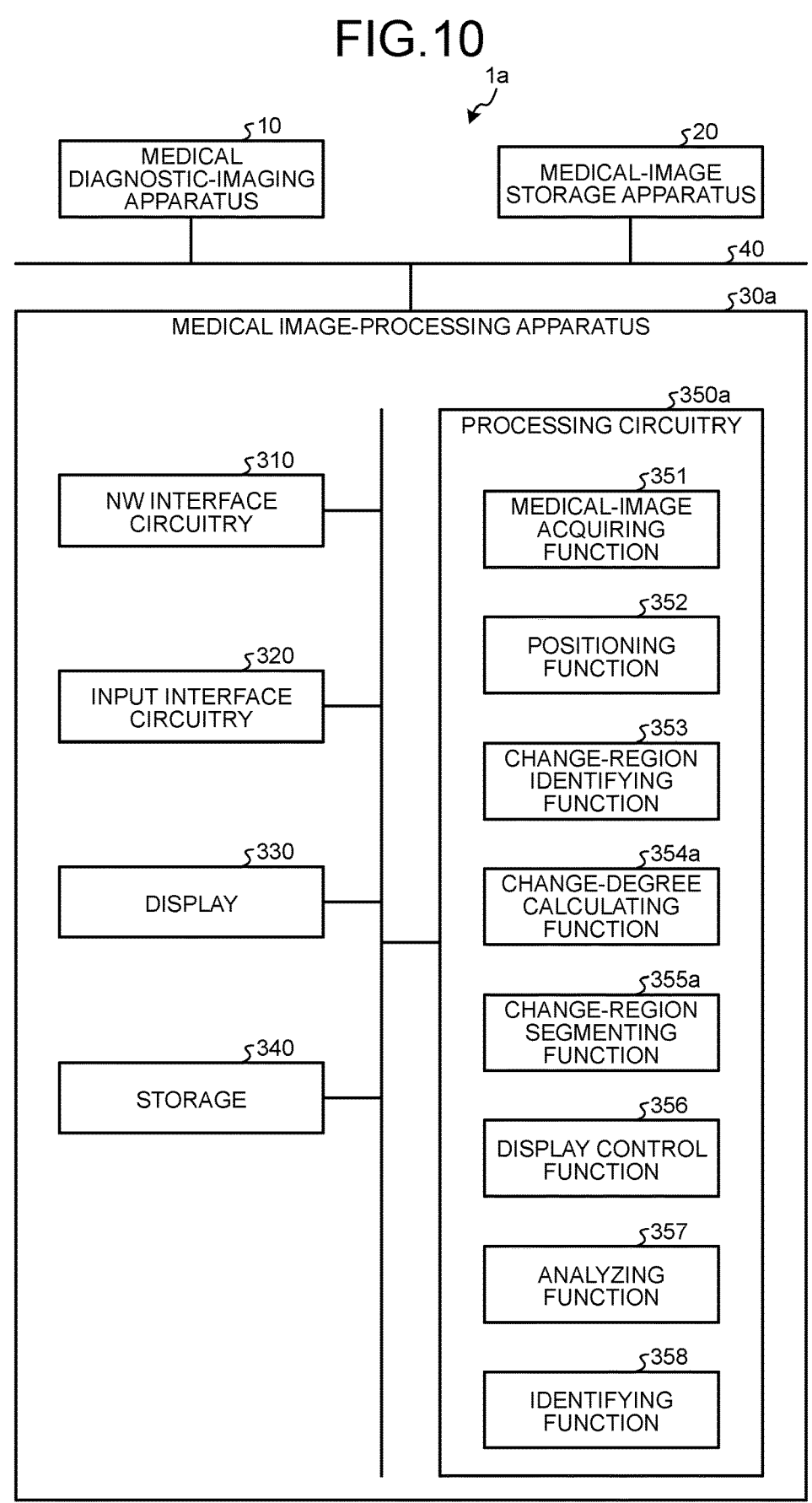
FIG. 10 is a block diagram illustrating an example of a configuration of a change-degree calculation system according to a second embodiment.

FIG. 10 is a block diagram illustrating an example of a configuration of a change-degree calculation system 1*a* according to a second embodiment.

A medical image-processing apparatus 30*a* in the change-degree calculation system 1*a* calculates a degree of change based on a distance from a contour of the first region R11 to each pixel to which a degree of change is to be assigned. The medical image-processing apparatus 30*a* segments the change region R1 into plural regions based on a degree of change.

Figure 11:
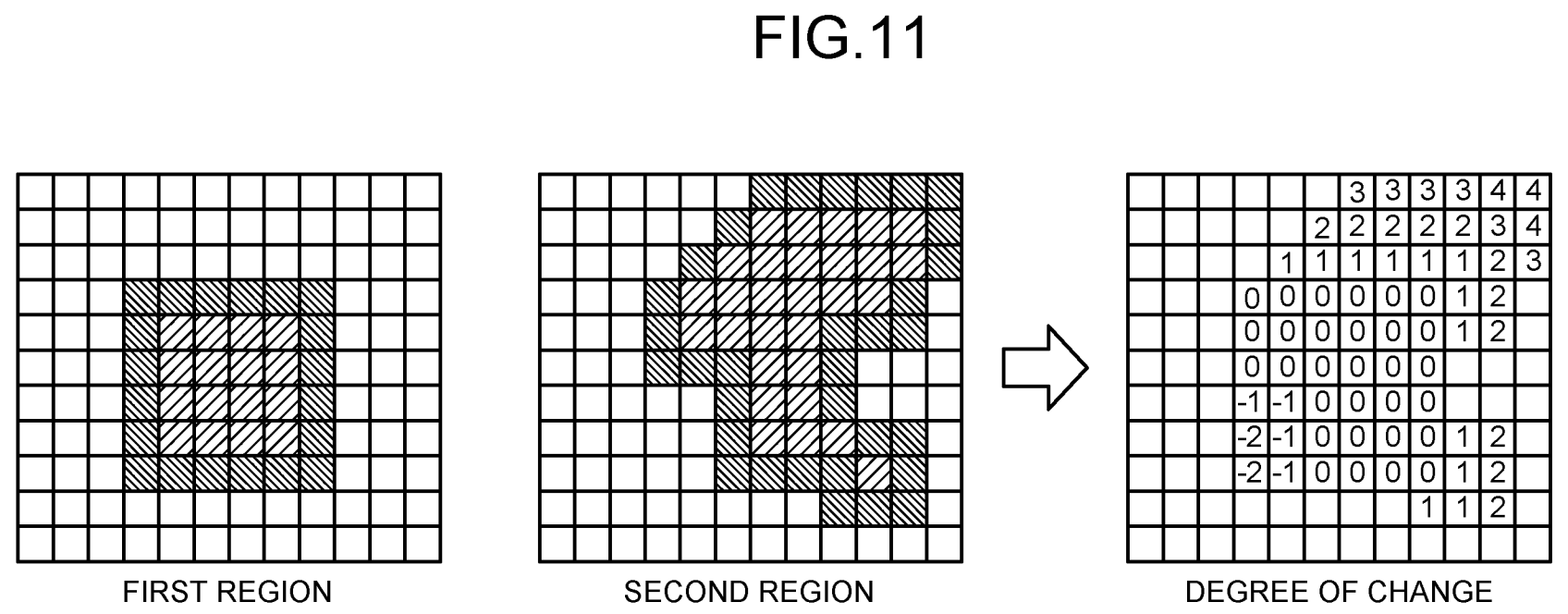

A change-degree calculating function 354*a* of processing circuitry 350*a* assigns a degree of change to respective pixels of the change region R1 based on a distance from a contour of the first region R1 to respective pixels of the change region R1 to which a degree of change is to be assigned. FIG. 11 is a diagram for explaining about an example of a method of assigning a degree of change. As illustrated in FIG. 11, the first region R11 and the second region R12 have respective contours. The change-degree calculating function 354*a* assigns a distance from the contour of the first region R11 to respective pixels to which a degree of change is to be assigned when the first region R11 and the second region R12 are overlaid on each other, to each of the pixels of the change region R1 as a degree of change. Moreover, to a pixel of a region that is included in the first region R11 and included in the second region R12, 0 is assigned as a degree of change because the distance is not far.

Moreover, in the second region R12, to a pixel of each part that has been shrunk from the first region R11, the change-degree calculating function 354*a* assigns a distance from the contour of the second region R12 to respective pixels to which a degree of change is to be assigned, as a degree of change. Furthermore, the change-degree calculating function 354*a* multiplies a degree of change of a pixel at a part that has been shrunk from the first region R11 by a negative value.

The change-degree calculating function 354*a* may assign other distances, not limited to a distance from a contour of the first region R11 to respective pixels to which a degree of difference is to be assigned. For example, the change-degree calculating function 354*a* may assign other distances, not limited to a distance from a contour of the second region R12 to respective pixels to which a degree of difference is to be assigned. Alternatively, the change-degree calculating function 354*a* may assign a degree of change to respective pixels of the change region R1 based on a distance from the center of the first region R11 to a pixel of the second region R12.

A change-region segmenting function 355*a* of processing circuitry 350*a* segments the change region R1 into plural regions based on degrees of change of the respective pixels of the change region R1. More specifically, the change-region segmenting function 355*a* segments the change region R1 based on classes set according to a degree of change set in advance. Thus, the change-region segmenting function 355*a* segments the change region R1 into plural regions.

Figure 12:
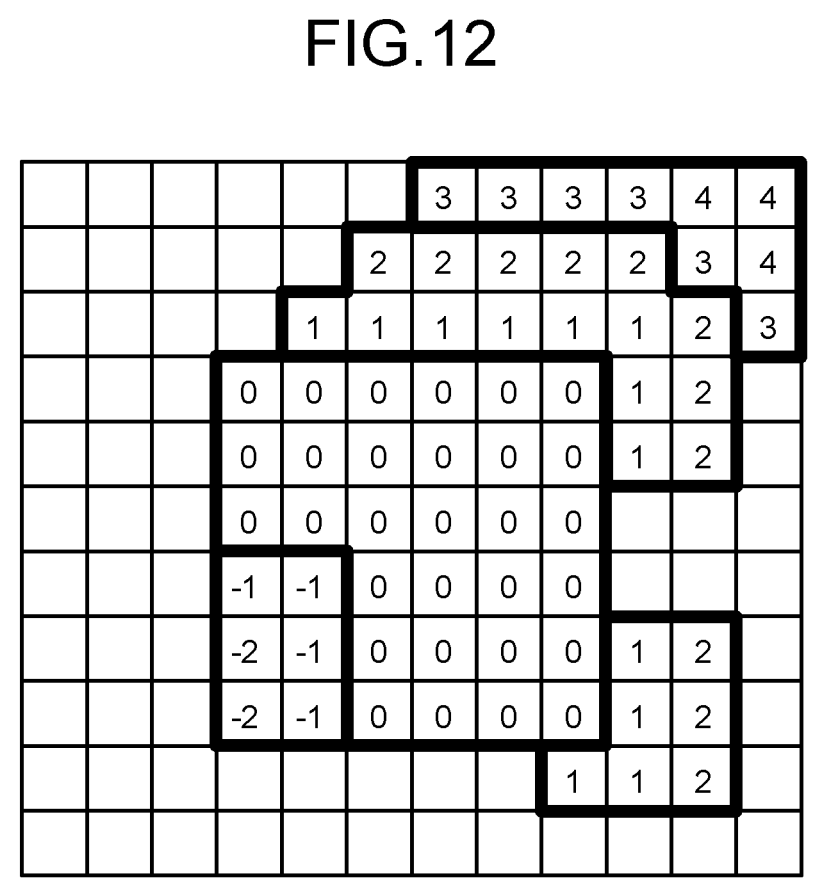

FIG. 12 is a diagram for explaining about an example of a segmentation method of segmenting into plural regions. As illustrated in FIG. 12, the change-region segmenting function 355*a* segments into, for example, a class of a degree of change −2 and −1, a class of a degree of change 0, a class of a degree of change 1 and 2, and a class of a degree of change 3 and 4. Thus, the change-region segmenting function 355*a* segments the change region R1 into plural regions.

As described above, the medical image-processing apparatus 30*a* according to the second embodiment assigns a degree of change to respective pixels of the change region R1 based on a distance from a contour of the first region R11 to the respective pixels to which a degree of change is to be assigned. In this case also, the medical image-processing apparatus 30*a* can calculate a degree of change of a region subject to analysis.

First Modification

It has been explained that the medical image-processing apparatuses 30, 30*a* include the medical-image acquiring function 351, the positioning function 352, the change-region identifying function 353, the change-degree calculating functions 354, 354*a*, the change-region segmenting functions 355, 355*a*, the display control function 356, and the analyzing function 357. However, all or some of these functional units may be included in an apparatus other than the medical image-processing apparatuses 30, 30*a*. For example, all or some of these functional units may be included in the medical-image storage apparatus 20, or may be included in an apparatus or a system not illustrated in FIG. 1.

Second Modification

It has been explained that the medical image-processing apparatuses 30, 30*a* implement the medical-image acquiring function 351, the positioning function 352, the change-region identifying function 353, the change-degree calculating functions 354, 354*a*, the change-region segmenting functions 355, 355*a*, the display control function 356, and the analyzing function 357 by executing programs stored in the storage 340. However, the medical image-processing apparatuses 30, 30*a* may implement all or some of the medical-image acquiring function 351, the positioning function 352, the change-region identifying function 353, the change-degree calculating functions 354, 354*a*, the change-region segmenting functions 355, 355*a*, the display control function 356, and the analyzing function 357 by hardware, such as a semiconductor circuit.

According to at least one of the embodiments and the like, a degree of change of a region subject to analysis can be calculated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image-processing apparatus, comprising:
   processing circuitry configured to
   acquire a first medical image captured at a first timing, and a second medical image in which an identical position to the first medical image is captured at a second timing, which is different from the first timing,
   identify a change region to be a logical OR of a first region included in the first medical image and a second region corresponding to the first region and included in the second medical image when the first medical image and the second medical image are overlaid on each other in an aligned manner,
   calculate a degree of change of the change region between the first timing and the second timing based on the first region and the second region that form the change region,
   segment the change region into a plurality of regions based on the calculated degree of change and
   identify a gene classification of interest for each of the segmented regions.

2. The medical image-processing apparatus according to claim 1, wherein the processing circuitry is further configured to display the segmented regions in a display mode according to the calculated degree of change.

3. The medical image-processing apparatus according to claim 1, wherein the processing circuitry is further configured to calculate a feature for each of the segmented regions.

4. The medical image-processing apparatus according to claim 1, wherein the processing circuitry is further configured to identify a treatment according to the identified gene classification.

5. The medical image-processing apparatus according to claim 4, wherein the processing circuitry is further configured to display the gene classification of each of the segmented regions, and the treatment according to the gene classification.

6. The medical image-processing apparatus according to claim 1, wherein the processing circuitry is further configured to assign a displacement vector calculated based on a vector indicating a change from the first region to the second region, to each pixel of the change region as the degree of change, and segment into a plurality of regions based on a similarity between the displacement vector assigned to a pixel and the displacement vector assigned to a surrounding pixel around the pixel.

7. The medical image-processing apparatus according to claim 1, wherein the processing circuitry is further configured to assign a displacement vector calculated based on a vector indicating a change from the first region to the second region, to each pixel of the change region as the degree of change, and segment the change region into a plurality of regions based on a class according to a magnitude of the displacement vector assigned to each pixel, based on class information in which a class according to a magnitude of the displacement vector is defined.

8. The medical image-processing apparatus according to claim 1, wherein the processing circuitry is further configured to assign the calculated degree of change to each pixel of the change region based on a distance from a contour of the first region to each pixel to which the degree of change is to be assigned, and segment into a plurality of regions based on the degree of change assigned to each pixel.

9. A change-degree calculation method, comprising:
acquiring a first medical image captured at a first timing, and a second medical image in which an identical position to the first medical image is captured at a second timing, which is different from the first timing;
identifying a change region to be a logical OR of a first region included in the first medical image and a second region that corresponds to the first region and is included in the second medical image when the first medical image and the second medical image are overlaid on each other in an aligned manner;
calculating a degree of change of the change region between the first timing and the second timing based on the first region and the second region that form the change region;
segmenting the change region into a plurality of regions based on the calculated degree of change and
identifying a gene classification of interest for each of the segmented regions.

10. A non-transitory computer-readable medium that includes a command causing a computer to execute:
acquiring a first medical image captured at a first timing, and a second medical image in which an identical position to the first medical image is captured at a second timing, which is different from the first timing;
identifying a change region to be a logical OR of a first region included in the first medical image and a second region that corresponds to the first region and is included in the second medical image when the first medical image and the second medical image are overlaid on each other in an aligned manner;
calculating a degree of change of the change region between the first timing and the second timing based on the first region and the second region that form the change region;
segmenting the change region into a plurality of regions based on the calculated degree of change, and
identifying a gene classification of interest for each of the segmented regions.

* * * * *